US008555371B1

(12) United States Patent
Signaoff et al.

(10) Patent No.: US 8,555,371 B1
(45) Date of Patent: Oct. 8, 2013

(54) SYSTEMS AND METHODS FOR MANAGEMENT OF NODES ACROSS DISPARATE NETWORKS

(75) Inventors: Christopher S. Signaoff, Hutto, TX (US); Tom W. Opsahl, Flower Mound, TX (US); Edward M. Riley, III, Flower Mound, TX (US); Justin S. Signaoff, Round Rock, TX (US)

(73) Assignee: DirectPacket Research, Inc., Irving, TX (US)

( * ) Notice: Subject to any disclaimer, the term of this patent is extended or adjusted under 35 U.S.C. 154(b) by 1117 days.

(21) Appl. No.: 12/505,268

(22) Filed: Jul. 17, 2009

(51) Int. Cl.
*G06F 9/00* (2006.01)

(52) U.S. Cl.
USPC ........ 726/12; 726/2; 726/3; 726/11; 713/151; 370/356; 370/395.5; 370/401; 370/467; 709/230; 709/203; 709/232; 709/238; 709/247

(58) Field of Classification Search
USPC ............. 726/2, 3, 11, 12; 713/151; 370/356, 370/395.5, 401; 709/230, 467, 203, 232, 709/238, 247
See application file for complete search history.

(56) References Cited

U.S. PATENT DOCUMENTS

| | | | | |
|---|---|---|---|---|
| 4,991,204 | A | * | 2/1991 | Yamamoto et al. ...... 379/221.01 |
| 5,838,683 | A | * | 11/1998 | Corley et al. ................. 370/408 |
| 5,933,490 | A | * | 8/1999 | White et al. ............. 379/221.01 |
| 5,956,339 | A | * | 9/1999 | Harada et al. ................. 370/400 |
| 6,047,320 | A | | 4/2000 | Tezuka et al. |
| 6,266,809 | B1 | | 7/2001 | Craig et al. |
| 6,366,576 | B1 | * | 4/2002 | Haga ............................ 370/352 |
| 6,380,968 | B1 | | 4/2002 | Alexander et al. |
| 6,434,140 | B1 | | 8/2002 | Barany et al. |
| 6,611,503 | B1 | | 8/2003 | Fitzgerald et al. |
| 6,614,465 | B2 | | 9/2003 | Alexander et al. |
| 6,633,324 | B2 | | 10/2003 | Stephens, Jr. |
| 6,633,985 | B2 | | 10/2003 | Drell |
| 6,711,166 | B1 | | 3/2004 | Amir et al. |
| 6,735,626 | B1 | | 5/2004 | Tezuka et al. |
| 6,795,444 | B1 | | 9/2004 | Vo et al. |
| 6,798,782 | B1 | | 9/2004 | Caronni et al. |
| 6,963,583 | B1 | | 11/2005 | Foti et al. |
| 7,016,935 | B2 | | 3/2006 | Lee et al. |
| 7,020,130 | B2 | | 3/2006 | Krause et al. |
| 7,023,465 | B2 | | 4/2006 | Stephens, Jr. |
| 7,031,341 | B2 | | 4/2006 | Yu |

(Continued)

OTHER PUBLICATIONS

International Search Report and Written Opinion issued for PCT/US2007/066435; Dated: Apr. 2, 2008; 9 Pages.

(Continued)

*Primary Examiner* — Kambiz Zand
*Assistant Examiner* — Tongoc Tran
(74) *Attorney, Agent, or Firm* — Fulbright & Jaworski LLP

(57) ABSTRACT

The present invention is directed generally to systems and methods for management of nodes, such as multimedia communication endpoints and/or intermediary devices, residing across disparate networks. Embodiments of the present invention provide systems and methods for managing by a centralized management system nodes residing on disparate protected networks, such as for managing such operations as scheduling, configuring, updating software, etc., nodes such as multimedia communication endpoints (e.g., videoconferencing endpoint devices and/or other multimedia communication devices) and/or intermediary devices (e.g., routers, switches, hubs, etc.). Further, embodiments of the present invention provide systems and methods for transmitting management data between a centralized management system and nodes on disparate protected networks without sacrificing security desired by each network and in a manner that is not administratively burdensome.

29 Claims, 4 Drawing Sheets

(56) References Cited

U.S. PATENT DOCUMENTS

| | | |
|---|---|---|
| 7,039,701 B2 | 5/2006 | Wesley |
| 7,050,422 B2 | 5/2006 | Xu et al. |
| 7,159,036 B2 | 1/2007 | Hinchliffe et al. |
| 7,177,929 B2 | 2/2007 | Burbeck et al. |
| 7,181,530 B1 | 2/2007 | Halasz et al. |
| 7,194,526 B2 | 3/2007 | Kanemitsu |
| 7,206,808 B2 | 4/2007 | Babka et al. |
| 7,228,488 B1 | 6/2007 | Grass et al. |
| 7,251,689 B2 | 7/2007 | Wesley |
| 7,293,169 B1 | 11/2007 | Righi et al. |
| 7,313,134 B2 | 12/2007 | Yarlagadda |
| 7,328,406 B2 | 2/2008 | Kalinoski et al. |
| 7,346,076 B1 | 3/2008 | Habiby et al. |
| 7,346,912 B2 | 3/2008 | Seebaldt |
| 7,353,380 B2 | 4/2008 | VanHeyningen |
| 7,363,381 B2 | 4/2008 | Mussman et al. |
| 7,370,097 B2 | 5/2008 | Hashimoto |
| 7,372,957 B2 | 5/2008 | Strathmeyer et al. |
| 7,385,622 B2 | 6/2008 | Babka et al. |
| 7,436,428 B2 | 10/2008 | Schrader et al. |
| 7,441,270 B1 | 10/2008 | Edwards et al. |
| 7,649,898 B1 | 1/2010 | May, Jr. et al. |
| 8,018,907 B2 * | 9/2011 | Kubler et al. ............ 370/338 |
| 2001/0043571 A1 * | 11/2001 | Jang et al. ............ 370/260 |
| 2001/0046234 A1 * | 11/2001 | Agrawal et al. ............ 370/402 |
| 2003/0021166 A1 * | 1/2003 | Soloff ............ 365/200 |
| 2003/0065737 A1 | 4/2003 | Aasman |
| 2003/0081783 A1 | 5/2003 | Adusumilli et al. |
| 2003/0182451 A1 | 9/2003 | Grass et al. |
| 2003/0227908 A1 | 12/2003 | Scoggins et al. |
| 2003/0232648 A1 | 12/2003 | Prindle |
| 2004/0037268 A1 | 2/2004 | Read |
| 2004/0158606 A1 | 8/2004 | Tsai |
| 2005/0021610 A1 | 1/2005 | Bozionek et al. |
| 2005/0021772 A1 * | 1/2005 | Shedrinsky ............ 709/228 |
| 2005/0080919 A1 | 4/2005 | Li et al. |
| 2005/0122964 A1 | 6/2005 | Strathmeyer et al. |
| 2005/0125696 A1 * | 6/2005 | Afshar et al. ............ 713/201 |
| 2005/0141482 A1 * | 6/2005 | Kleiner ............ 370/352 |
| 2005/0186523 A1 * | 8/2005 | Waisath ............ 431/120 |
| 2005/0243747 A1 | 11/2005 | Rudolph |
| 2005/0259145 A1 | 11/2005 | Schrader et al. |
| 2005/0271051 A1 | 12/2005 | Holloway et al. |
| 2006/0098684 A1 | 5/2006 | Bozionek et al. |
| 2006/0104288 A1 | 5/2006 | Yim et al. |
| 2006/0109862 A1 | 5/2006 | Choi et al. |
| 2006/0187903 A1 | 8/2006 | Kallio et al. |
| 2006/0190719 A1 | 8/2006 | Rao et al. |
| 2006/0224883 A1 | 10/2006 | Khosravi et al. |
| 2007/0005804 A1 | 1/2007 | Rideout |
| 2007/0022201 A1 | 1/2007 | Aaby et al. |
| 2007/0036143 A1 | 2/2007 | Alt et al. |
| 2007/0239841 A1 | 10/2007 | Lehrman |
| 2007/0242696 A1 | 10/2007 | Signaoff et al. |
| 2008/0043091 A1 | 2/2008 | Lia et al. |
| 2008/0134200 A1 * | 6/2008 | Seebaldt ............ 719/310 |
| 2008/0235362 A1 | 9/2008 | Kjesbu et al. |
| 2009/0051752 A1 | 2/2009 | Lammers |
| 2009/0112671 A1 | 4/2009 | Grodum |

OTHER PUBLICATIONS

International Search Report and Written Opinion issued for PCT/US2007/066451; Dated: Jul. 7, 2008; 11 Pages.

International Search Report and Written Opinion issued for PCT/US07/66457 dated Jun. 17, 2008, 10 pgs.

International Search Report and Written Opinion issued for PCT/US2007/066460; Dated: Apr. 9, 2008; 10 Pages.

\* cited by examiner

SYSTEMS AND METHODS FOR MANAGEMENT OF NODES ACROSS DISPARATE NETWORKS

CROSS-REFERENCE TO RELATED APPLICATIONS

The present application is related to and commonly-assigned U.S. patent application Ser. No. 11/403,549 (now published as U.S. Patent Application Publication No. 2007/0242696) titled "SYSTEM AND METHOD FOR TRAVERSING A FIREWALL WITH MULTIMEDIA COMMUNICATION" filed Apr. 13, 2006, the disclosure of which is hereby incorporated herein by reference.

TECHNICAL FIELD

The following description relates, in general, to management of network devices or "nodes," such as endpoint communication devices used for multimedia communication (e.g., videoconferencing endpoint devices and/or other multimedia communication endpoint devices) and/or intermediary communication devices that are typically not communication endpoints such as routers, switches, hubs, etc. Such management includes, for example, managing such operations as scheduling, configuring, updating software, etc. for network nodes. The description relates more specifically to systems and methods for transmitting management data for managing network nodes residing on disparate networks without sacrificing security desired by each network and in a manner that is not administratively burdensome.

BACKGROUND

The Internet may be used for many forms of communication, including voice conversations, video conferencing, development collaboration, and the like. In order for a manufacturers' programs, applications, equipment, and systems to be interoperable with each other, many protocols have been developed to standardize the communication between such systems. For example, video conferencing calls often involve the interfacing of video network endpoint devices manufactured by a variety of different manufacturers and using a variety of protocols and network communication interfaces.

Communication protocols have grown increasingly complex to handle all the types of traffic generated to facilitate communication for video conferencing, voice over Internet Protocol (VoIP), and data over Internet Protocol applications. Two such protocols are H.323 from the International Telecommunication Union-Telecommunication Standardization Sector (ITU-T) and the Session Initiation Protocol (SIP) from the Internet Engineering Task Force (IETF). Both H.323 and SIP typically allow for multimedia communication including voice, video, and data communications in real-time. H.323 and SIP each rely on multiple other protocols, some of which may in turn rely on User Datagram Protocol (UDP) for sending and receiving multimedia traffic. UDP features minimal overhead compared to other transport protocols (most notably Transmission Control Protocol (TCP)) at the expense of having less reliability. UDP does not provide for guaranteed packet delivery nor data integrity. UDP does offer the highest possible throughput, thus, making it ideally suited for multimedia real-time communications.

Within a given communication network, various network nodes may be communicatively coupled to the network for use in enabling communication between two or more endpoint devices. For instance, a network may include various switches, routers, hubs, and/or other intermediary devices that are used for transporting communication (e.g., data, voice, etc.) between two or more endpoint devices. Further, various types of endpoint communication devices may be implemented to, for instance, receive input from a user (e.g., to be communicated across the network to another user) and/or to output received information to the user. Thus, an endpoint communication device refers to a device at which communication originates or at which communication is destined (e.g., terminates), whereas various intermediary devices, such as switches, routers, etc., may reside between the endpoint devices on the network for transporting communication between the endpoint devices. Both the endpoint devices and the intermediary devices are referred to generally as network nodes.

In Internet Protocol (IP) communication networks, nodes on the network are typically identified by their respective IP address. Often, however, certain nodes, particularly endpoint devices used for videoconferencing (or other multimedia communication), are not persistent within a given network, but may instead be moved from location to location and thus their respective IP addresses may change from time to time. For instance, a given video conference endpoint device may be moved within a company from one conference room to another conference room as needed for various scheduled meetings to occur in the conference rooms (where the endpoint device is connected to the company's local area network via different network access points at each conference room).

Disparate networks, such as different local area networks (LANs), are typically protected by a firewall that restricts certain externally-originated communication from entering the protected network. That is, the firewall of a given LAN may block certain traffic to minimize the risk of allowing malicious traffic into the LAN. Accordingly, multimedia communications traffic will most likely have to traverse a firewall at some point during transmission, especially over the Internet, regardless to which protocol the traffic conforms. Firewalls are used in modern networks to screen out unwanted or malicious traffic. It should be understood that, as used herein, a "firewall" may refer to any piece of equipment or device that is configured to restrict certain externally-originated communication from entering the protected network. As one example, a firewall may be implemented via an access control list and/or rules deployed on a router or other device. Of course, a firewall may be achieved through implementation of any access control device that restricts certain traffic from entering and/or exiting the protected network.

As multimedia communications, such as videoconferencing, have grown in popularity, a need has arisen for managing the endpoint communication devices (i.e., the devices that output communication to participants on a call and/or that receive input communication from participants on a call, such as video capture equipment, video display equipment, voice capture equipment, and voice output equipment, including as examples, telephones, videophones, etc.). Endpoint communication devices may be stand-alone devices (e.g., a stand-alone telephone or video display) or they may be implemented as embedded within other devices, such as a VoIP application embedded within a processor-based computer, such as a laptop or PC. Any of various management operations, such as scheduling use of the endpoints for conferences, upgrading/updating software on the endpoint devices, configuring the endpoint devices, monitoring and diagnosing problems of the endpoint devices, and/or performing various other management operations for the endpoint devices, may be desired from time to time. Accordingly, various computer-based management systems have been developed for managing endpoint devices. For instance, certain management systems enable an administrator to interact with a computer console to perform such management tasks as scheduling conferences, etc. Examples of traditional endpoint management systems include those commercially available from TANDBERG, such as TANDBERG'S MANAGEMENT SUITE (TMS). Further management systems that have been proposed include, as examples, those described in U.S. Pat. No. 7,206,808 titled "System and Method for Managing Diverse Video Network Devices via Application and Interface Objects", U.S. Pat. No. 7,385,622 titled "Method and System for Presenting a Video Call Management Console", U.S. Pat. No. 7,346,912 titled "Method and System for Managing Video Devices", U.S. Patent Application Publication No. 2007/0022201 titled "Method for Instant Scheduling of Conference Calls", and U.S. Patent Application Publication No. 2008/0134200 titled "Method and System for Managing Video Devices", the disclosures of which are hereby incorporated herein by reference. TANDBERG's system is commonly employed for managing video endpoints. Similar systems, such as those available from LUCENT TECHNOLOGIES, may be employed for managing data network nodes, and similar systems, such as those available from CISCO SYSTEMS, INC., may be employed for managing voice and/or voice-over-IP (VoIP) nodes.

As discussed further hereafter, traditional endpoint management systems are commonly implemented for management of endpoints that reside on the same LAN as the management system. Central management of endpoints that reside on different networks (e.g., on different LANs) raises additional issues. For example, the above-mentioned TMS system resides on a given LAN and expects to be able to communicate with endpoint(s) directly on its LAN. The TMS system has no ability to seek out endpoints that are not accessible on its immediate network. So, the TMS system implemented on one LAN is generally not employed for managing an endpoint located on a different LAN.

When endpoints desired to be managed are located in different networks, the traditional methods used to gain communication to the endpoints include some type of Network Address Translation (NAT), such as one-to-one-NAT, on the edge firewalls or routers, which would basically create an externally accessible IP address with access rules to given mirrored protocols (e.g., UDP or TCP) that would translate directly to the endpoint. Because each of the LANs on which the endpoints reside will typically have their own firewalls, the NAT would typically be required to be implemented on two or more firewalls and may require a lot of administrative overhead to accomplish. Further, if care is not taken to correctly set up the access rules, a given LAN may become vulnerable to external attacks by allowing access to unwanted entities into the network. Alternatively, a traditional Virtual Private Network (VPN) may be established to bridge the different LANs, and access rules may be established to restrict access to the VPN. Again, a lot of administrative overhead may be required in implementing such a VPN solution.

The above solutions are impractical and difficult to employ when the network nodes (e.g., endpoint devices) to be managed reside on disparate LANs that are not governed or owned by the same entity or administrator. For instance, when a management system residing in a first LAN desires access for managing endpoint devices in a second LAN that is not owned or governed by a common entity (e.g., as when the LANs are of different companies), the network administrator of the second LAN will be reluctant to permit establishment of such a connection with the management system of the first LAN unless great administrative burden is undertaken to ensure that proper access rules are established. The administrative burden for establishing such a connection, and the risk of diminished security resulting from establishing such a connection, presents a great obstacle that generally prevents the establishment of a connection to enable a management system residing on one LAN to manage endpoint devices on disparate LANs. Indeed, oftentimes the administrators within an organization who are responsible for management of multimedia communication endpoints, such as videoconferencing equipment, are not the same persons who govern the network security of the organization (such as its firewalls, routers, etc.), and thus the administrators desiring to permit management of the multimedia communication endpoints may have further obstacles within their own organization in order to permit appropriate access to the network for management by an external management system.

The network security administrators within a protected LAN are generally resistant to establishment of one-to-one-NAT relationships or implementing VPN connection, for example, in order to permit access to the endpoint devices by a management system residing outside of the protected LAN because such establishment will likely allow unwanted traffic not only from unauthorized outside resources to reach into the protected LAN but also because the established connection may permit access from within the protected LAN to resources that are not supposed to be accessed by the LAN's devices. So, it is very difficult for administrators to make sure that the access permissions are locked down. Accordingly, centralized management of multimedia communication endpoint devices across disparate networks is generally not undertaken due, at least in part, on the above-mentioned administrative burdens and security risks associated therewith.

Various different communication protocols may be utilized by a management system for managing endpoint communication devices, such as HTTP, HTTPS, FTP, TFTP, TELNET, and/or SNMP, as examples. To support all of such protocols, further difficulty may arise for an administrator to permit suitable access to a protected LAN by an external management system while maintaining proper security, thereby further increasing the administrative burden associated with establishing such a connection.

In view of the above, traditional management systems, such as the TMS system, are generally implemented for management of endpoints on a common LAN. Management of network nodes (e.g., endpoint devices) that reside on disparate networks (e.g., disparate protected LANs) may each be managed by their respective management system that resides on their respective network, but the nodes across disparate networks are generally not managed in a coordinated fashion by a centralized management system. Again, traditional techniques for undertaking any centralized management of endpoint devices across disparate protected networks generally involve use of either a NAT or VPN and requires undesirable administrative burden to establish communication connections for the centralized management system with the disparate networks, while also giving rise to an undesirable security vulnerability.

BRIEF SUMMARY

The present invention is directed generally to systems and methods for management of nodes, such as multimedia communication endpoints and/or intermediary devices, residing across disparate networks. Embodiments of the present invention provide systems and methods for managing by a centralized management system nodes residing on disparate protected networks, such as for managing such operations as scheduling, configuring, updating software, etc., nodes such as multimedia communication endpoints (e.g., videoconferencing endpoint devices and/or other multimedia communication devices) and/or intermediary devices (e.g., routers, switches, hubs, etc.). Further, embodiments of the present invention provide systems and methods for transmitting management data between a centralized management system and nodes on disparate protected networks without sacrificing security desired by each network and in a manner that is not administratively burdensome.

According to one embodiment, a system comprises a management system communicatively coupled with a first protected network, and at least one network node communicatively coupled with a second protected network. The system further comprises a router device (which may be referred to herein as a secure IPC router) communicatively coupled with the second protected network. The router device identifies one or more of the network node(s) coupled to the second protected network for which management permission is granted to the management system. The system further comprises a manager support device communicatively coupled with the first protected network. According to certain embodiments, the manager support device enables the network nodes from disparate protected networks to be managed by the management system as if they were coupled to a common local network with the management system. As described further herein, the manager support device may be referred to as a secure node manager or secure endpoint manager in certain embodiments. In one embodiment, the manager support device receives identification of the one or more network nodes for which management permission is granted to the management system and associates each of the one or more network nodes with a localized address on the first protected network such that the one or more network nodes appear to the management system as residing on the first protected network.

In one embodiment, the one or more network nodes comprise at least one communication endpoint device. In one embodiment, the manager support device is configured to receive communication from the management system that is directed to a localized address of the one or more network nodes. The manager support device may be configured to transmit the received communication to a centralized controller device that resides outside the first protected network, and the centralized controller device may in turn direct the communication to the router device. In other embodiments, the manager support device may receive information (e.g., from the centralized controller device) to enable the manager support device to transmit management communication directly to the router device of the second protected network, rather than requiring all management communication destined for a network node residing on the second protected network to flow through the controller device.

In one embodiment, a secure node management system is disclosed that provides a turn key solution which comprises a secure node manager (SNM), an IPC controller, and one or more IPC routers. The secure node manager may, in certain embodiments, be implemented for managing endpoint devices (in addition to or instead of intermediary devices) across disparate networks, and thus such manager may be referred to as a secure endpoint manager (SEM). The SEM resides in a network with a management system that is to be employed for managing endpoints on disparate protected networks, and in certain embodiments, the SEM associates with each endpoint on the disparate protected networks a localized address to make those endpoints appear to the management system as though they reside on the same network as the management system.

An IPC router is implemented in each of the disparate protected networks to identify each of the endpoint devices on the IPC router's respective network for which management permission is granted to the centralized management system. In certain embodiments, the IPC controller is communicatively coupled to all of the disparate protected networks and compiles (from the IPC routers) an inventory of those endpoint devices across the various disparate protected networks that have granted management permission to the centralized management system. The SEM receives the list of endpoint devices and associates a localized address with each endpoint device. Thus, when the management system directs communication to a localized address of an endpoint device on a disparate protected network, the SEM receives the communication and directs it to the IPC router of the network on which the endpoint device resides. Further, as discussed herein, the SEM may encapsulate the communication into an encapsulated communication that is transmitted via a single TCP port to permit the communication to traverse firewalls without requiring reconfiguration of the firewalls to accept the communication. The IPC router receives the communication, decapsulates it, and directs it to the endpoint device. Thus, when used in conjunction with one another, the SEM, IPC controller, and IPC router(s) facilitate simplified integration and expanded reach of a secured global management strategy for IP video, and/or VoIP audio communication devices, and the systems that govern their functionality from one centralized location, according to one embodiment of the present invention.

In certain embodiments, it is transparent to the management system and the managed endpoint devices that they reside on disparate protected networks and that there is an intermediary (e.g., SEM) between them that is enabling their connection. Thus, to the management system the endpoint devices residing on disparate protected networks (e.g., LANs) appear as though they reside on the same network as the management system. Accordingly, traditional management systems, like the TMS system, may be employed to manage the endpoint devices in the disparate protected networks just as those systems commonly manage the local endpoints. Further, the administratively burdensome process for establishing a NAT or VPN with appropriate access rules in order to achieve a connection between the management system and the remote endpoints residing on disparate protected networks is not required. Further, modification or reconfiguration of the firewalls protecting the disparate networks is not required, and thus the further administrative burden associated with reconfiguring the firewalls is alleviated and the potential reduction in security that may result from any such reconfiguration is likewise avoided by certain embodiments.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art, that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
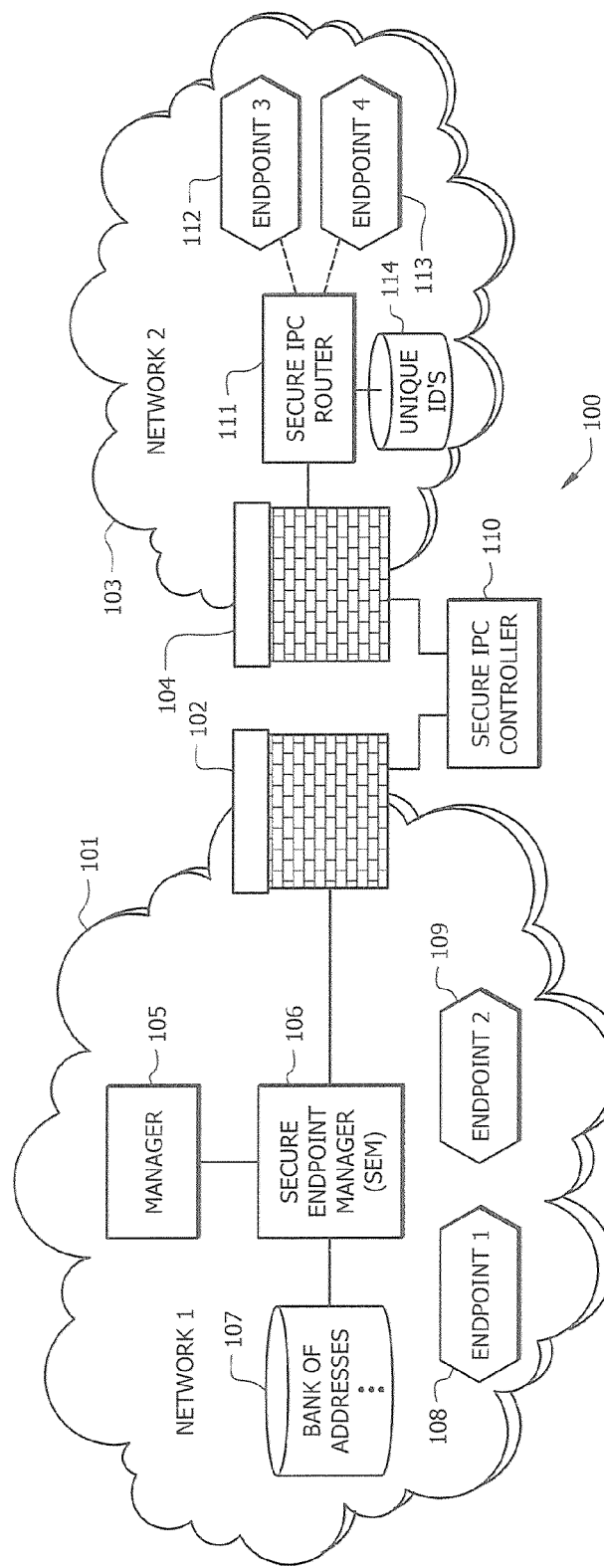
FIG. 1 shows an exemplary system for managing network nodes (e.g., multimedia communication endpoints) across disparate protected networks according to one embodiment of the present invention.

FIG. 1 shows a block-diagram representation of an exemplary system 100 for managing network nodes (e.g., multimedia communication endpoints) across disparate protected networks (e.g., networks 101 and 103) according to one embodiment of the present invention. System 100 comprises two disparate protected networks, network 101 and network 103. Each of the networks may, for example, be a LAN of different entities (e.g., different organizations, companies, etc.). Each network is protected by a respective firewall). For instance, firewall 102 is implemented for network 101, and firewall 104 is implemented for network 103. Each network's firewall restricts certain externally-originated communication from entering the protected network to screen out unwanted or malicious traffic. In addition, the firewall may be configured to restrict what external resources devices within the protected network may be permitted to access.

In the illustrated example of FIG. 1, each of network 101 and 103 comprises one or more network nodes. For instance, multimedia communication endpoint devices 108 and 109 are coupled to network 101, and multimedia communication endpoint devices 112 and 113 are coupled to network 103. The endpoint devices may be any suitable devices that output communication to participants on a call and/or that receive input communication from participants on a call, such as video capture equipment, video display equipment, voice capture equipment, and voice output equipment. Examples of such multimedia communication endpoint devices include telephones, videophones, VoIP phones, etc. The endpoint devices may be stand-alone devices or they may be embedded with another device, such as integrated with or implemented on a PC or other processor-based computing device. The endpoint devices may be employed for enabling users to communicate with each other during multimedia communication sessions. Such multimedia communication may be conducted via the Internet (e.g., IP-based communication) and/or other communication networks for communicating voice, video, and/or other content (e.g., presentation data, screen-sharing, etc.) between the users during a multimedia communication session established between the users. While multimedia communication endpoint devices are shown in the example of FIG. 1, it should be understood that other network nodes (e.g., intermediary devices) may be implemented and such other network nodes may be managed in a similar manner as described herein for managing the endpoint devices of FIG. 1.

Embodiments of the present invention enable the endpoint devices across disparate protected networks (e.g., endpoint devices 108, 109, 112, and 113 across networks 101 and 103) to be managed from a central management system. For instance, in the illustrated example of FIG. 1 a management system 105 is implemented within network 101. Such management system 105 may comprise any endpoint management system, such as the TMS system available from TANDBERG. While described in connection with FIG. 1 as an endpoint management system, in certain embodiments management system 105 may be a management system for managing any network nodes, such as intermediary nodes (e.g., routers, switches, etc.). Management system 105 generally comprises a processor-based system, which may include a management application executing on a personal computer (PC) or other computer coupled to network 101, and management system 105 may further comprise user input and output devices, such as a display to which a user interface of the management application is presented, and a keyboard, mouse, and/or other input devices for receiving input from the user to the management application. As discussed further hereafter, embodiments of the present invention enable management system 105 to be used for performing management operations not only for endpoint devices 108 and 109 that reside on the common network 101 with management system 105 (as with traditional multimedia endpoint management systems), but also for endpoint devices residing on disparate protected network(s), such as endpoints 112 and 113 residing on network 103.

Any of various management operations, such as scheduling use of the endpoints for conferences, upgrading/updating software on the endpoint devices, configuring the endpoint devices, monitoring and diagnosing problems of the endpoint devices, and/or performing various other management operations for the endpoint devices, may be desired from time to time. Any such management operations may be supported by management system 105. For instance, a user may interact with a management application executing on management system 105 to control performance of any such management operations for endpoint devices 108, 109, 111, and 113.

Embodiments of the present invention enable such management of multimedia endpoint devices 108, 109, 112, and 113 across disparate protected networks 101 and 103 without requiring establishment of a NAT or VPN, without requiring undesirable administrative burden for establishing communication connections between the management system 105 and the endpoint devices in the disparate protected networks, and without requiring a sacrifice in desired security protection provided by each protected network's firewall. In the exemplary embodiment of FIG. 1, a centralized management system that enables management of multimedia endpoint devices 108, 109, 112, and 113 across the disparate protected networks 101 and 103 via management system 105 is achieved through implementation of a secure endpoint manager (SEM) 106 within network 101, secure IPC controller 110, and secure IPC router 111 within network 103, as discussed further hereafter.

SEM 106, which may be referred to herein as a manager support device, resides on the same network 101 as management system 105. SEM 106 generally comprises a processor-based system, which may include a computer-executable software application executing on a personal computer (PC) or other computer coupled to network 101 (e.g., for performing the operations described further herein for SEM 106). While shown separately for ease of illustration and discussion in FIG. 1, SEM 106 may be implemented on a common processor-based device as management system 105 in certain embodiments. As discussed further below, SEM 106 effectively extends the reach of management system 105 through the internet into a disparate protected network 103, thereby allowing management system 105 to manage endpoints 112 and 113 as if they resided in local network 101.

As shown in the example of FIG. 1, SEM 106 may be communicatively coupled to a data storage device 107 to which is stored a pool of addresses/identifications of various endpoint devices for which management access has been granted to management system 105. That is, a bank of IP addresses may be stored as computer-readable data (e.g., as a database, file, chart, or other data structure) to data storage device 107, where the bank of IP addresses include addresses that effectively identify the endpoints 112 and 113 of the disparate protected network 103. In certain embodiments, the bank of IP addresses assign a local address to each endpoint, thereby making the remote devices 112 and 113 appear to management system 105 as though they reside in local network 101. In this way, SEM 106 enables management system 105 to not only access the endpoint devices 108 and 109 residing on network 101, but also access the various endpoint devices 112 and 113 residing on disparate network 103 as if those devices 112 and 113 were residing locally on network 101.

Data storage device 107 may be any computer-readable data storage device, such as a hard drive, memory, magnetic storage device, optical storage device, etc. Data storage device 107 may reside integral with the computing device implementing SEM 106 and/or may be a separate device that is communicatively coupled (e.g., via a communication network, such as network 101) with the computing device implementing SEM 106.

In one embodiment, a router, such as secure IPC router 111, is implemented in the "far" network 103 (that is remote from the network 101 in which management system 105 resides), where such router 111 compiles a list of endpoints within its network 103 for which management access permission is granted for management system 105. IPC router 111 generally comprises a processor-based system, which may include a computer-executable software application executing on a PC or other computer coupled to network 103 (e.g., for performing the operations described further herein for IPC router 111). The permission for management system 105 to access the endpoint devices 112 and 113 (for management operations) may be granted via secure IPC router 111. For instance, an administrator may interact with a user interface of secure IPC router 111 and/or a user interface of controller 110 to specify those endpoints for which management access permission is granted to management system 105.

The permission list compiled by secure IPC router 111 may identify each endpoint device by a corresponding object identifier (OID) and/or MAC address of the device. In general, assigning an OID to a device is a well-known process that is commonly employed for management of devices (e.g., via SNMP). The OIDs identify devices that can be managed. Of course, identifiers other than OIDs may be employed in certain embodiments. For instance, device identifying information in XML may be obtained (e.g., via HTTP) certain embodiments, and so any information (be it OID, XML source, proprietary discovery protocol messages, etc.) may be used for gathering identifying data for qualifying devices that are able to be managed in accordance with embodiments of the present invention. The compiled list identifying the endpoints on network 103 for which access permission is granted to management system 105 may be stored as computer-readable data (e.g., a file, database, or other data structure) by secure IPC router 111 to a computer-readable data storage device 114 to which secure IPC router 111 is communicatively coupled.

The network address associated with a given endpoint may change from time to time, such as when the endpoint is moved from one conference room to another conference room, etc. In one embodiment, the SNMP trap function may be employed to enable the endpoint device to continue being recognized/accessible for management operations even after its network address changes. For instance, the router 111 may be the trap function host, and a cold start message may be used to obtain the IP address that comes across against the database of identifiers. In other configurations, the registration message may be sniffed to obtain the IP address of the endpoint device. As other examples, RAS messages, SNMP messages, etc. may also be used to obtain the changed network address of the endpoint device by router 111. In general, router 111 keeps track of the local IP address as the device moves around on the local network, and the controller 110 and/or SEM 106 just use the OID (or other identifier) for the endpoint device.

While only one remote protected network, network 103, is shown in the example of FIG. 1 as containing endpoint devices to be managed by centralized management system 105, in other implementations any number of remote protected networks that contain endpoint devices to be managed by management system 105 may be present. In the illustrated example of FIG. 1, a secure IPC controller 110 is implemented for compiling identification of the various endpoint devices (e.g., across any number of disparate networks) for which management permission is granted to management system 105. Secure IPC controller 110 generally comprises a processor-based system, which may include a computer-executable software application executing on a PC or other computer communicatively coupled to networks 101 and 103 (e.g., for performing the operations described further herein for IPC controller 110). For instance, each of networks 101 and 103 may be LANs that are communicatively coupled to a wide area network (WAN), such as the Internet, and IPC controller 110 may likewise be communicatively coupled to the WAN such that it can communicate via the WAN with each of the LANs 101 and 103.

In the illustrated embodiment, secure IPC controller 110 performs an inventory of the various IPC routers of disparate protected networks, such as IPC router 111 of network 103, to determine those various endpoint devices that reside in the disparate networks which have granted management access permission to management system 105. According to one embodiment, when a router 111 is first brought online (connected to its local network 103), it establishes a communication path with the controller 110. As such, the router(s) 111 that are pre-configured to connect to a given controller 110 (or which are configured by an administrator to connect to a given controller 110) form a community of routers of disparate protected networks that are all communicatively coupled to controller 110. Then, responsive to a user interacting with a user interface of controller 110 to activate an "inventory endpoint button" or responsive to some other action, such as upon a predefined schedule), controller 110 sends a request out to all of the routers in its community. Each of the routers 111 return to the controller 110 identification of the network nodes (e.g., communication endpoints) on the router's respective protected network for which management permission is granted (e.g., as identified in data storage device 114) to the centralized management system 105. The resulting inventoried list of endpoint devices that have granted permission to management system 105 is made available from controller 110 to SEM 106, which then assigns (in the address bank stored to storage device 107) a locally-accessible IP address to each endpoint device.

Thereafter, when the management system 105 wants to communicate with endpoints 112 and/or 113, it uses the IP address assigned by SEM 106 to those addresses (within the stored bank of addresses stored to storage device 107). In certain embodiments, a similar address mapping may be performed within network 103 (e.g., by router 111) for management system 105 to make management system 105 appear to the endpoints 112 and 113 as though the management system 105 resides locally within network 103 (e.g., so that if the endpoint devices want to push information to the management system they believe they are communicating with a local management system). In certain embodiments, it is transparent to the management system 105 and the managed endpoint devices 112 and 113 that they reside on disparate protected networks and that there is an intermediary between them (e.g., SEM 106) that is enabling their connection. Thus, to management system 105 the endpoint devices 112 and 113 may appear as though they reside on network 101, like endpoint devices 108 and 109. Thus, traditional management systems, like the TMS system, may be employed to manage the endpoint devices 112 and 113 in the disparate protected network 103 just as those systems commonly manage the local endpoints 108 and 109. Further, the administratively burdensome process for establishing a NAT or VPN with appropriate access rules in order to achieve a connection between management system 105 and the endpoints 112 and 113 is not required. Further, as discussed below, modification or reconfiguration of the firewalls 102 and 104 is not required, and thus the further administrative burden associated with reconfiguring the firewalls is alleviated and the potential reduction in security that may result from any such reconfiguration is likewise avoided by certain embodiments.

In certain embodiments, SEM 106 enables communication between management system 105 and endpoint devices 112 and 113 without requiring modification or reconfiguration of the firewalls 102 and 104. As discussed below, in certain embodiments SEM 106 may encapsulate the communication into an encapsulated communication that is transmitted via a single TCP port, thereby enabling the encapsulated communication to traverse firewalls via a commonly-open port) without requiring any reconfiguration to the firewall to accept the communication. As discussed further herein, for instance, certain communication techniques described in co-pending and commonly-assigned U.S. patent application Ser. No. 11/403,549 (now published as U.S. Patent Application Publication No. 2007/0242696) titled "SYSTEM AND METHOD FOR TRAVERSING A FIREWALL WITH MULTIMEDIA COMMUNICATION" filed Apr. 13, 2006 (hereafter "the '549 application"), the disclosure of which is incorporated herein by reference, for traversing firewalls may be similarly employed for enabling management information to be communicated from SEM 106 through firewalls of disparate protected networks.

Figure 2:
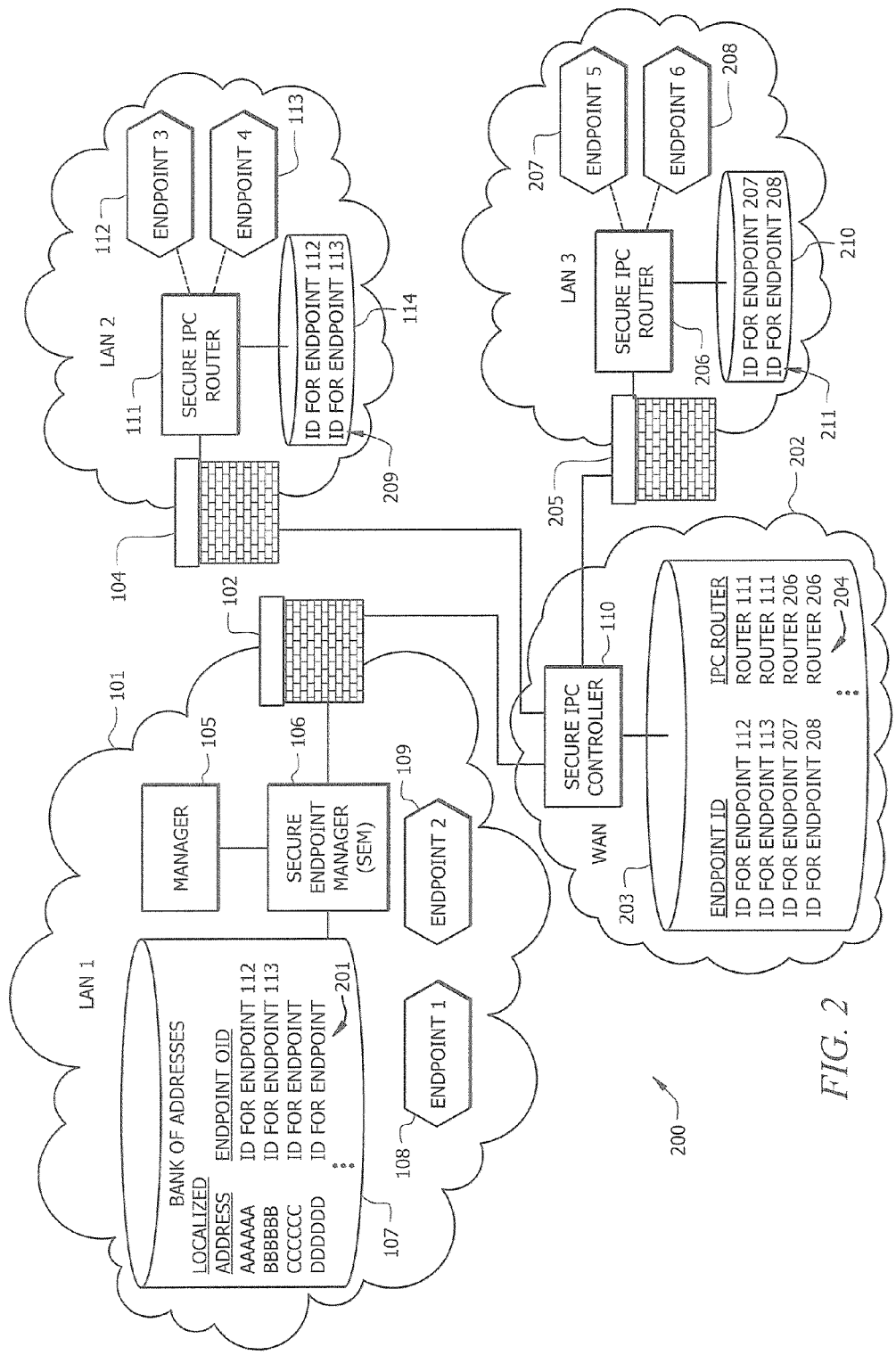
FIG. 2 shows another exemplary system for managing network nodes across disparate protected networks according to one embodiment of the present invention.

Turning to FIG. 2, another exemplary system 200 for managing network nodes (e.g., multimedia communication endpoints) across disparate protected networks according to one embodiment of the present invention is shown. System 200 comprises three disparate protected networks, which in this example are disparate protected LANs, shown as LAN 1, LAN 2, and LAN 3. Each LAN is protected by a respective firewall 102, 104, and 205. Each LAN's firewall restricts certain externally-originated communication from entering the protected LAN to screen out unwanted or malicious traffic. In addition, the firewall may be configured to restrict what external resources devices within the protected LAN may be permitted to access.

Each of the LANs include one or more multimedia communication endpoints that are desired to be managed by a central management system, shown as central management system 105 implemented in LAN 1. For instance, LAN 1 includes endpoints 108-109, LAN 2 includes endpoints 112-113, and LAN 3 includes endpoints 207-208 in the illustrated example of FIG. 2. Of course, any number of disparate LANs that each include any number of multimedia communication endpoint devices (and/or other network nodes to be managed) may be implemented in a given embodiment.

In the illustrated example of FIG. 2, management system 105 is implemented within LAN 1. Such management system 105 may comprise any endpoint management system, such as the TMS system available from TANDBERG. As discussed above with FIG. 1, management system 105 is communicatively coupled (e.g., via LAN 1) with SEM 106. As discussed further hereafter, embodiments of the present invention enable management system 105 to be used for performing management operations not only for endpoint devices 108-109 that reside on the local LAN, LAN 1, with management system 105 (as with traditional multimedia endpoint management systems), but also for endpoint devices residing on disparate protected network(s), such as endpoints 112-113 and 207-208 residing on disparate protected LANs LAN 2-LAN 3.

As discussed further herein, embodiments of the present invention enable such management of endpoint devices 108-109, 112-113, and 207-208 across disparate protected LANs 1-3 by central management system 105 without requiring establishment of a NAT or VPN, without requiring undesirable administrative burden for establishing communication connections between the management system 105 and the endpoint devices in the disparate protected LANs, and without requiring a sacrifice in desired security protection provided by each protected LAN's firewall 102, 104, and 205. As in the example of FIG. 1, a SEM 106 is implemented in the LAN in which the central management system 105 resides, i.e., LAN 1 in this example. Also, secure IPC routers 111 and 206 are implemented in LANs 2 and 3, respectively. In certain embodiments, an IPC router may further be implemented in local LAN, LAN 1, and SEM 106 may interact with such router in the local LAN for communicating management information between manager 105 and the local endpoints 108-109 in a manner similar to that described for interacting with the remote routers 111 and 206. In other embodiments, manager 105 may manage local endpoints 108 and 109 in a traditional manner without employing a local secure IPC router in the local LAN, LAN 1. Further, secure IPC controller 110 is again implemented, which is shown as communicatively coupled with a WAN 202 (e.g., the Internet) that communicatively interconnects the disparate protected LANs 1-3.

The administrators of LANs 2-3 may each decide to permit their respective endpoint devices (or at least designated ones of the endpoint devices within the LANs) to be managed by management system 105, and thus each LAN's respective IPC router associates the grant of management permission for the LAN's endpoints to management system 105. For instance, IPC router 111 of LAN 2 associates the IDs of endpoint devices 112-113 as granting management permission to management system 105 of LAN 1. Such association may be stored as computer-readable data 209 (e.g., file, database, etc.) stored to a computer-readable medium 114 that is communicatively coupled with IPC router 111. Similarly, IPC router 206 of LAN 3 associates the IDs (e.g., OIDs) of endpoint devices 207-208 as granting management permission to management system 105 of LAN 1. Again, such association may be stored as computer-readable data 211 (e.g., file, database, etc.) stored to a computer-readable medium 210 that is communicatively coupled with IPC router 206.

In the example of FIG. 2, secure IPC controller 110 compiles an inventory list of all endpoint devices across the LANs 2-3 that have granted management permission to management system 105. In one embodiment, as each IPC router comes online it communicatively connects to secure IPC controller 110. For instance, each IPC router may be preconfigured to communicatively connect to a specified controller 110 and/or a user may input information to the IPC router instructing the IPC router to connect to a particular controller 110. The controller 110 may (e.g., responsive to a user activation or via preconfigured periodic performance) send an inventory request to each of the IPC routers that have connected to it, such as routers 111 and 206 in the example of FIG. 2. In response, IPC controller 110 may receive from IPC router 111 the list of IDs (e.g., OIDs) of endpoint devices 112-113, and IPC controller 110 may associate such IDs as being received from (and/or accessible through) IPC router 111. Similarly, IPC controller 110 may receive from IPC router 206 the IDs of endpoint devices 207-208, and IPC controller 110 may associate such IDs as being received from (and/or accessible through) IPC router 206.

In the exemplary embodiment of FIG. 2, IPC controller 110 stores to data storage device 203 information 204 identifying the IDs and the corresponding IPC router via which each ID is accessible. IPC controller 110 communicates the list of IDs for the endpoints that have granted management permission to management system 105 to SEM 106.

As shown in the example of FIG. 2, SEM 106 may be communicatively coupled to a data storage device 107 to which is stored a pool of addresses/identifications of various endpoint devices for which management access has been granted to management system 105. That is, a bank of IP addresses may be stored as computer-readable data (e.g., as a database, file, chart, or other data structure) to data storage device 107, where the bank of IP addresses include addresses that effectively identify the endpoints of the disparate protected LANs 2-3 which have granted management permission to management system 105. As shown in the example of FIG. 2, the bank of address information 201 includes for each endpoint device identification of the endpoint device (e.g., the OID for each endpoint device), as well as a respective localized address within LAN 1 that SEM 106 assigns to the endpoint device.

Thus, SEM 106 effectively makes the endpoint devices 112-113 and 207-208 that reside on disparate protected LANs 2-3 appear to management system 105 as though they reside locally within LAN 1 (and are accessible via their respective localized addresses assigned by SEM 106). When management system 105 directs communication to one of the endpoint devices (by directing the communication to the assigned localized address of the device), SEM 106 receives that communication and communicates the information uses the information 201 to communicate the information to controller 110 as destined for the corresponding endpoint ID. The controller 110 receives the information and determines, from information 204, the corresponding secure IPC router to which the communication should be routed (e.g., in order to access the endpoint identified by the ID). The communication is then sent from controller 110 to the determined IPC router along with identification of the endpoint for which it is destined (e.g., along with the endpoint's ID), and the IPC router receives the communication and routes it to the corresponding endpoint within the IPC router's LAN.

As an example, suppose that management system 105 directs communication to endpoint device 112 (by directing the communication to the assigned localized address "AAAAAA" of the device). SEM 106 receives that communication and uses the information 201 to determine the corresponding ID for endpoint device 112, and SEM 106 sends the communication along with the ID for endpoint device 112 to controller 110. Controller 110 receives the communication and uses information 204 to determine the secure IPC router to which the communication should be routed for endpoint 112 as router 111. The communication is then sent from controller 110 to the determined IPC router 111 along with identification of the endpoint 112 for which it is destined (e.g., along with the endpoint's 110, and the IPC router 111 receives the communication and routes it to the corresponding endpoint 112 within the IPC router's LAN 2. In this way, SEM 106 enables management system 105 to not only access the endpoint devices 108-109 residing locally on LAN 1, but also access the various endpoint devices 112-113 and 207-208 residing on disparate protected LANs 2-3 as if those devices 112-113 and 207-208 were residing locally on LAN 1.

As a specific example, suppose that management system 105 is employed by an user to schedule endpoint devices 108, 112, and 207 to come on for some communication session that is going to occur at a specified time. The user may interact with a user interface of the management system (e.g., via a management workstation) to search and find the different endpoint devices 108, 112, and 207 (e.g., via information 201, which specifies the endpoint devices for which management permission has been granted to the management system 105), and the user may input for the endpoint devices the desired schedule for a call. The schedule is directed from management system 105 to the assigned localized addresses of the devices 108, 112, and 207. Then, the SEM 106 receives that communication from the management system and sends the schedule to controller 110 (along with identification of the endpoint device to which the communication is destined). Controller 110 uses information 204 to determine each endpoint's respective IPC router, and routes the information (along with identification of the endpoint device to which the communication is destined) to the determined IPC routers. Thus, for instance, the schedule information directed to endpoint devices 112 and 207 is directed by controller 110 to IPC routers 111 and 206, respectively. The schedule information directed endpoint device 108 may either be sent directly to device 108 (since it resides locally on LAN) or it may be sent by SEM 106 to an IPC router that is implemented on local LAN 1 (not shown in the example of FIG. 2). The IPC router then routes the received schedule information to the endpoint devices to which the information pertains. For instance, IPC router 111 routes the schedule information to endpoint device 112 on LAN 2.

The management system 105 may communicate with the endpoint devices using any of various different communication protocols, such as HTTP, HTTPS, FTP, TFTP, SSH, TELNET, and SNMP, as examples. Different protocols may be used for different management operations. For instance, HTTP may be used for communicating the scheduling information in the above example, FTP may be used for communicating software updates to endpoint devices, and SNMP may be used for pinging an endpoint device to determine whether it is operational (or to otherwise query an endpoint device for information). SEM 106 receives the communication in whatever protocol is used by management system 105 and communicates the received information to the destination endpoint devices as discussed above. As discussed further below, in certain embodiments, SEM 106 may manipulate the communication, such as by encapsulating the communication in a carrier protocol, for traversing firewalls of the protected LANs.

Further, in certain embodiments, the communication of management information between SEM 106, controller 110, and the IPC routers is transmitted through the protected networks' respective firewalls 102, 104, and 205 without requiring the firewalls to be modified or reconfigured in any way to specifically authorize such communication. In certain embodiments, the exemplary communication technique described in co-pending and commonly-assigned U.S. patent application Ser. No. 11/403,549 (now published as U.S. Patent Application Publication No. 2007/0242696) titled "SYSTEM AND METHOD FOR TRAVERSING A FIREWALL WITH MULTIMEDIA COMMUNICATION" filed Apr. 13, 2006 (hereafter "the '549 application"), the disclosure of which is incorporated herein by reference, is employed for communicating the management information between the SEM 106, controller 110, and the IPC routers such that the information traverses the firewalls. The '549 application describes, in part, exemplary techniques for enabling communication between endpoint devices that reside on disparate networks that may each be protected by firewalls, wherein the communication can flow through the firewalls without requiring the administrative burden of reconfiguring the firewalls to permit such communication and without requiring changes to firewalls that would render their respective networks vulnerable to malicious electronic attacks. The techniques described in the '549 application for transmitting communication between endpoint devices (e.g., during multimedia communication sessions) may similarly be employed for transmitting management information for managing the endpoint devices.

In general, as discussed in the '549 application, the management information may be encapsulated to result in an encapsulated communication that is transmitted through a single TCP port. In certain embodiments, the SEM 106 (or controller 110) encapsulates the management information that it receives from the management system 105 (such as the scheduling information discussed in the above example) to result in an encapsulated communication that is suitable for transmission through a single TCP port.

Suppose, for instance, that management system 105 desires to communicate a software update via FTP to endpoint device 113 on LAN 2. Management system 105 sends the FTP communication to the localized address "BBBBBB" assigned in information 201 to endpoint device 113. SEM 106 receives the FTP communication and may encapsulate that FTP communication in a "carrier" encapsulated communication protocol that is transmitted over a single TCP port. SEM 106 sends the encapsulated communication to controller 110, along with identification that the communication is intended for endpoint 113 (e.g., the OID of endpoint 113). The controller 110 determines that the encapsulated communication is to be routed to secure IPC router 111 for endpoint 113, and thus routes the encapsulated communication to such IPC router 111 along with the OID (or other identifier) of endpoint 113. While firewall 104 of LAN 2 might block a FTP communication from entering LAN 2, the encapsulated communication protocol directed to a single, commonly-open TCP port is accepted by the firewall 104 without requiring any reconfiguration of modification of the firewall. IPC router 111 receives the communication and decapsulates it to result in the original FTP communication sent by the management system 105, and IPC router 111 then routes the FTP communication to the destination endpoint device 113.

As discussed further in the '549 application, in certain embodiments the communication may be encrypted. For instance, in the above example, the FTP communication may be encrypted, and the resulting encrypted information may then be encapsulated as discussed above. Then, upon receipt by IPC router 111, the communication may be decapsulated and then decrypted. Any suitable encryption technique may be employed, such as use of AES 256 bit encryption.

In certain embodiments, the communication may be further converted into a proprietary communication protocol, such as a proprietary communication protocol that is not generally recognized but that is known by SEM 106, controller 110, and IPC routers 111 and 206. For instance, in the above example, the FTP communication may be converted by SEM 106 into a proprietary protocol recognized by SEM 106, controller 110, and IPC routers 111 and 206, the communication may then optionally be encrypted, and the resulting information may then be encapsulated as discussed above. Then, upon receipt by IPC router 111, the communication may be decapsulated, decrypted (if encrypted), and then converted from the proprietary protocol back into the original FTP communication, which is then communicated from IPC router 111 to the destination endpoint device 113.

In the example of FIG. 2 all management communication destined for a device on a disparate network from the network on which the management system 105 resides flows through controller 110. In certain embodiments, controller 110 need not be involved in all communication. For instance, turning to FIG. 3, another exemplary system 300 for managing network nodes (e.g. multimedia communication endpoints and/or intermediary nodes) across disparate protected networks according to one embodiment of the present invention is shown. System 300 comprises four disparate protected networks, which in this example are disparate protected LANs, shown as LAN 1, LAN 2, LAN 3, and LAN 4. Each LAN is protected by a respective firewall 301A-301D. Each LAN's firewall restricts certain externally-originated communication from entering the protected LAN to screen out unwanted or malicious traffic. In addition, the firewall may be configured to restrict what external resources devices within the protected LAN may be permitted to access.

Each of the LANs include one or more network nodes that are desired to be managed by a central management system, shown as central management system 105 implemented in LAN 1. For instance, LAN 1 includes communication endpoints 304-306, LAN 2 includes communication endpoints 309-311 and intermediary node (e.g., Private Branch Exchange (PBX)) 315, LAN 3 includes communication endpoint 307, and LAN 4 includes communication endpoint 308 in the illustrated example of FIG. 3. Of course, any number of disparate LANs that each include any number of multimedia communication endpoint devices may be implemented in a given embodiment. Thus, in the illustrated example, the management system may be used to not only manage the various communication endpoint devices, but also to manage certain other network nodes, such as intermediary nodes (e.g., PBX 215). In the illustrated example, communication endpoint devices 304, 305, and 309 are shown as telephones, which may be VoIP phones, videophones, or any other telephone device that supports at least voice communication, and communication endpoint devices 306-308, 310, and 311 are shown as display devices which may be any communication device that supports at least video communication, such as a video display device, PC, etc. While illustrative communication endpoint devices 304-311 are shown in FIG. 3, it is to be understood that embodiments of the present invention are not limited to those devices shown, but instead any communication endpoint device may be implemented in any of the LANs and be managed by central management system 105 in accordance with embodiments of the present invention.

Figure 3:
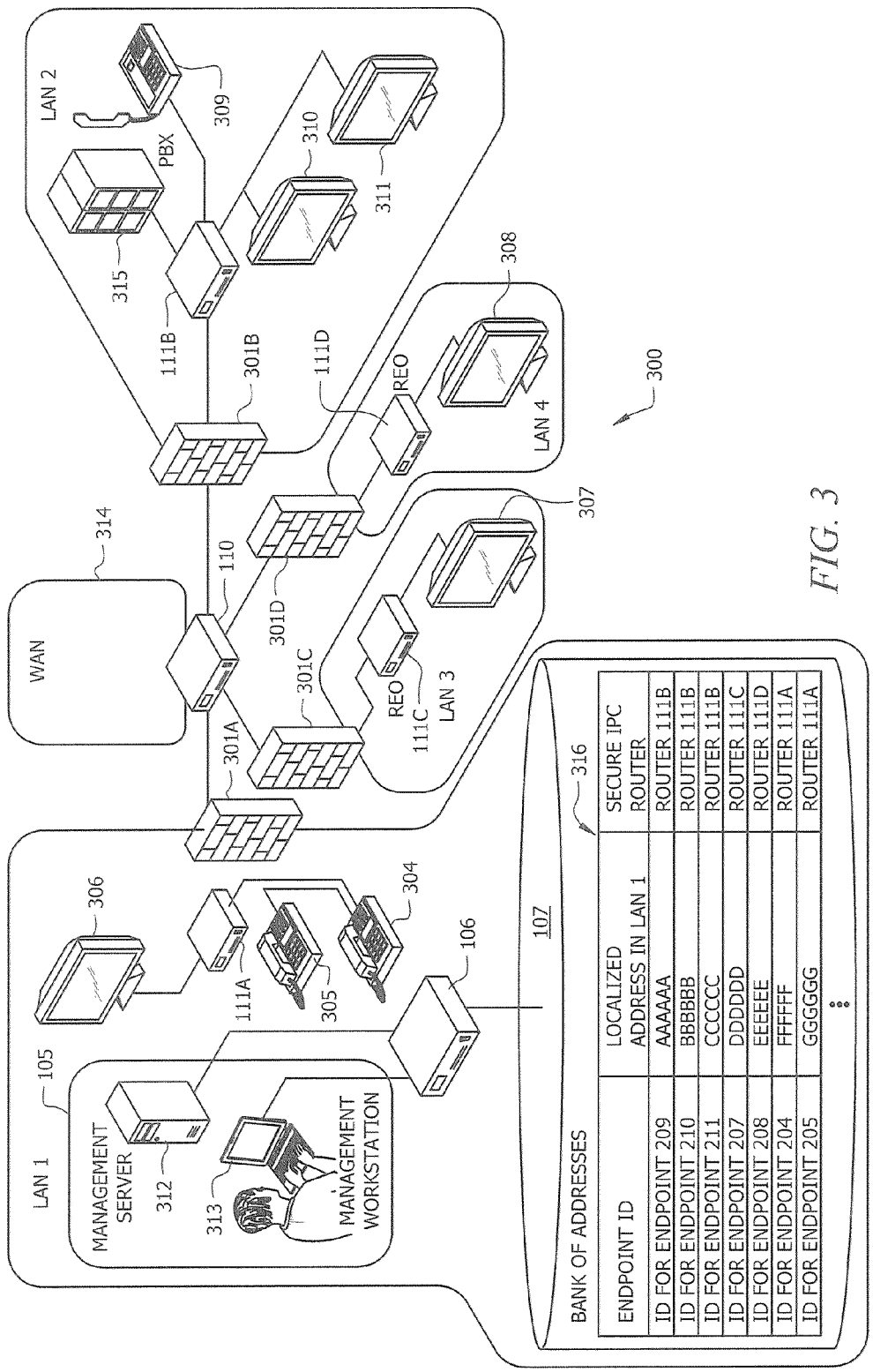
FIG. 3 shows yet another exemplary system for managing network nodes across disparate protected networks according to an embodiment of the present invention.

In the illustrated example of FIG. 3, management system 105 is implemented within LAN 1. Such management system 105 may comprise any endpoint management system, such as the TMS system available from TANDBERG. In the illustrated example, management system 105 comprises a management server 312 and/or a management workstation 313 that are communicatively coupled with SEM 106. As discussed further hereafter, embodiments of the present invention enable management system 105 to be used for performing management operations not only for endpoint devices 304-306 that reside on the local LAN, LAN 1, with management system 105 (as with traditional multimedia endpoint management systems), but also for endpoint devices residing on disparate protected network(s), such as endpoints 307-311 residing on disparate protected LANs LAN 2-LAN 4.

As discussed further herein, embodiments of the present invention enable such management of endpoint devices 304-311 across disparate protected LANs 1-4 by central management system 105 without requiring establishment of a NAT or VPN, without requiring undesirable administrative burden for establishing communication connections between the management system 105 and the endpoint devices in the disparate protected LANs, and without requiring a sacrifice in desired security protection provided by each protected LAN's firewall 301-303. As in the example of FIG. 1, a SEM 106 is implemented in the LAN in which the central management system 105 resides, i.e., LAN 1 in this example. Also, secure IPC routers 111A-111D are implemented in LANs 1-4, respectively. In the example of FIG. 3, a secure IPC router is not only implemented in each of the "far" LANs 2-3, but a secure IPC router (router 111A) is also implemented in LAN 1, along with SEM 106. Further, secure IPC controller 110 is again implemented, which is shown as communicatively coupled with a WAN 214 (e.g., the Internet) that communicatively interconnects the disparate protected LANs 1-4.

Because the administrators of LANs 2-3 have each decided to permit their respective endpoint devices (or at least designated ones of the endpoint devices within the LANs) to be managed by management system 105, each LAN's respective IPC router associates the grant of management permission for the LAN's endpoints to management system 105. For instance, IPC router 111B of LAN 2 associates the IDs (e.g., OIDs or other unique identifier) of endpoint devices 309-311 as granting management permission to management system 105 of LAN 1. Such association may be stored as computer-readable data (e.g., file, database, etc.) stored to a computer-readable medium that is communicatively coupled with IPC router 111B, such as via a data storage device 114 as discussed above with FIGS. 1-2. Similarly, IPC router 111C of LAN 3 associates the ID of endpoint device 307 as granting management permission to management system 105 of LAN 1, and IPC router 111D of LAN 4 associates the ID of endpoint device 308 as granting management permission to management system 105 of LAN 1 Again, such associations may be stored as computer-readable data (e.g., file, database, etc.) stored to a computer-readable medium that is communicatively coupled with IPC routers 111C and 111D, respectively, such as via a data storage device 114 as discussed above with FIGS. 1-2.

In the example of FIG. 3, secure IPC controller 110 compiles an inventory list of all endpoint devices across the LANs 2-4 that have granted management permission to management system 105. For instance, IPC controller 110 may receive from IPC router 111B the list of IDs of endpoint devices 309-311, and IPC controller 110 may associate such IDs as being, received from (and/or accessible through) IPC router 111B. Similarly, IPC controller 110 may receive from IPC routers 111C and 111D the IDs of endpoint devices 307 and 308, and IPC controller 110 may associate such IDs as being received from (and/or accessible through) IPC routers 111C and 111D, respectively. IPC controller 110 then communicates the list of IDs and identification of their respective IPC router to SEM 106. As discussed further hereafter, this may permit SEM 106 to communicate management information to the secure IPC routers without requiring such communication to flow through controller 110, in certain embodiments.

As shown in the example of FIG. 3, SEM 106 may be communicatively coupled to a data storage device 107 to which is stored a pool of addresses/identifications of various endpoint devices for which management access has been granted to management system 105. That is, a bank of IP addresses may be stored as computer-readable data (e.g., as a database, file, chart, or other data structure) to data storage device 107, where the bank of IP addresses include addresses that effectively identify the endpoints of the disparate protected LANs 2-4 which have granted management permission to management system 105. As shown in the example of FIG. 2, the bank of address information 316 includes for each endpoint device identification of the endpoint device (e.g., the OID for each endpoint device), a respective localized address within LAN 1 that SEM 106 assigns to the endpoint device, and identification of the secure IPC router through which the endpoint device is accessible.

Thus, SEM 106 effectively makes the endpoint devices 307-311 that reside on disparate protected LANs 2-4 appear to management system 105 as though they reside locally within LAN 1 (and are accessible via their respective localized addresses assigned by SEM 106). When management system 105 directs communication to one of the endpoint devices (by directing the communication to the assigned localized address of the device), SEM 106 receives that communication and uses the information 316 to determine the corresponding secure IPC router to which the communication should be routed. The communication may then be sent to the determined IPC router along with identification of the endpoint for which it is destined (e.g., along with the endpoint's OID), and the IPC router receives the communication and routes it to the corresponding endpoint within the IPC router's LAN.

As an example, suppose that management system 105 directs communication to endpoint device 309 (by directing the communication to the assigned localized address "AAAAAA" of the device). SEM 106 receives that communication and uses the information 316 to determine the corresponding secure IPC router to which the communication should be routed for endpoint 309 as router 111B. The communication is then sent to the determined IPC router 111B along with identification of the endpoint 309 for which it is destined (e.g., along with the endpoint's OID), and the IPC router 111B receives the communication and routes it to the corresponding endpoint 309 within the IPC router's LAN 2. In this way, SEM 106 enables management system 105 to not only access the endpoint devices 304-306 residing locally on LAN 1, but also access the various endpoint devices 307-311 residing on disparate protected LANs 2-4 as if those devices 307-311 were residing locally on LAN 1.

As a specific example, suppose that management system 105 is employed by an user to schedule endpoint devices 306, 309, and 310 to come on for some communication session that is going to occur at a specified time. The user may interact with a user interface of the management system (e.g., via management workstation 313) to search and find the different endpoint devices 306, 309, and 310 (e.g., via information 316, which specifies the endpoint devices for which management permission has been granted to the management system 105), and the user may input for the endpoint devices the desired schedule for a call. The schedule is directed from management system 105 to the assigned localized addresses of the devices 306, 309, and 310. Then, the SEM 106 receives that communication from the management system and sends the schedule to each endpoint's respective IPC router (along with identification of the endpoint device to which the communication is destined). Thus, for instance, the schedule information directed to endpoint devices 309 and 310 is directed by SEM 106 to IPC router 111B (based on the association information 316) and the schedule information directed endpoint device 306 may either be sent directly to device 306 (since it resides locally on LAN 1) or it may be sent by SEM 106 to IPC router 111A. Again, unique IDs of the endpoint devices 304-306 residing on LAN 1 for which management permission is granted to management system 105 may be stored as computer-readable data (e.g., file, database, etc.) stored to a computer-readable medium that is communicatively coupled with IPC router 111A, such as via a data storage device 114 as discussed above with FIGS. 1-2. The IPC router then routes the received schedule information to the endpoint devices to which the information pertains. For instance, IPC router 111B routes the schedule information to endpoint devices 309 and 310 on LAN 2.

The management system 105 may communicate with the endpoint devices using any of various different communication protocols, such as HTTP, FTP, TFTP, SSH, TELNET, and SNMP, as examples. Different protocols may be used for different management operations. For instance, HTTP may be used for communicating the scheduling information in the above example, FTP may be used for communicating software updates to endpoint devices, and SNMP may be used for pinging an endpoint device to determine whether it is operational (or to otherwise query an endpoint device for information). SEM 106 receives the communication in whatever protocol is used by management system 105 and communicates the received information to the destination endpoint devices as discussed above. As discussed further below, in certain embodiments, SEM 106 may manipulate the communication, such as by encapsulating the communication in a carrier protocol, for traversing firewalls of the protected LANs.

Further, in certain embodiments, the communication of management information between SEM 106 and the IPC routers is transmitted through the protected networks' respective firewalls 301A-301D without requiring the firewalls to be modified or reconfigured in any way to specifically authorize such communication. In certain embodiments, the exemplary communication technique described in co-pending and commonly-assigned U.S. patent application Ser. No. 11/403,549 (now published as U.S. Patent Application Publication No. 2007/0242696) titled "SYSTEM AND METHOD FOR TRAVERSING A FIREWALL WITH MULTIMEDIA COMMUNICATION" filed Apr. 13, 2006 (hereafter "the '549 application"), the disclosure of which is incorporated herein by reference, is employed for communicating the management information between the SEM 106 and the IPC routers such that the information traverses the firewalls. The '549 application describes, in part, exemplary techniques for enabling communication between endpoint devices that reside on disparate networks that may each be protected by firewalls, wherein the communication can flow through the firewalls without requiring the administrative burden of reconfiguring the firewalls to permit such communication and without requiring changes to firewalls that would render their respective networks vulnerable to malicious electronic attacks. The techniques described in the '549 application for transmitting communication between endpoint devices (e.g., during multimedia communication sessions) may similarly be employed for transmitting management information for managing the endpoint devices.

In general, as discussed in the '549 application, the management information may be encapsulated into an encapsulated communication that is transmitted through a single TCP port. In certain embodiments, the SEM 106 encapsulates the management information that it receives from the management system 105 (such as the scheduling information discussed in the above example) into an encapsulated communication that is suitable for transmission through a single TCP port.

Suppose, for instance, that management system 105 desires to communicate a software update via FTP to endpoint device 310 on LAN 2. Management system 105 sends the FTP communication to the localized address "BBBBBB" assigned in information 316 to endpoint device 310. SEM 106 receives the FTP communication and may encapsulate that FTP communication in a "carrier" encapsulated communication protocol that is transmitted over a single TCP port. SEM 106 directs the encapsulated communication to the IPC router 111B that is associated with the endpoint device 310. While firewall 301B of LAN 2 might block a FTP communication from entering LAN 2, the encapsulated communication protocol directed to a single, commonly-open TCP port is accepted by the firewall 301B without requiring any reconfiguration of modification of the firewall. IPC router 111B receives the communication and decapsulates it to result in the original FTP communication sent by the management system 105, and IPC router 111B then routes the FTP communication to the destination endpoint device 310.

As discussed further in the '549 application, in certain embodiments the communication may be encrypted. For instance, in the above example, the FTP communication may be encrypted, and the resulting encrypted information may then be encapsulated as discussed above. Then, upon receipt by IPC router 111B, the communication may be decapsulated and then decrypted. Any suitable encryption technique may be employed, such as use of AES 256 bit encryption.

In certain embodiments, the communication may be further converted into a proprietary communication protocol, such as a proprietary communication protocol that is not generally recognized but that is known by SEM 106 and IPC routers 111A-111D. For instance, in the above example, the FTP communication may be converted by SEM 106 into a proprietary protocol recognized by SEM 106 and IPC routers 111A-111D, the communication may then optionally be encrypted, and the resulting information may then be encapsulated as discussed above. Then, upon receipt by IPC router 111B, the communication may be decapsulated, decrypted (if encrypted), and then converted from the proprietary protocol back into the original FTP communication, which is then communicated from IPC router 111B to the destination endpoint device 310.

Figure 4:
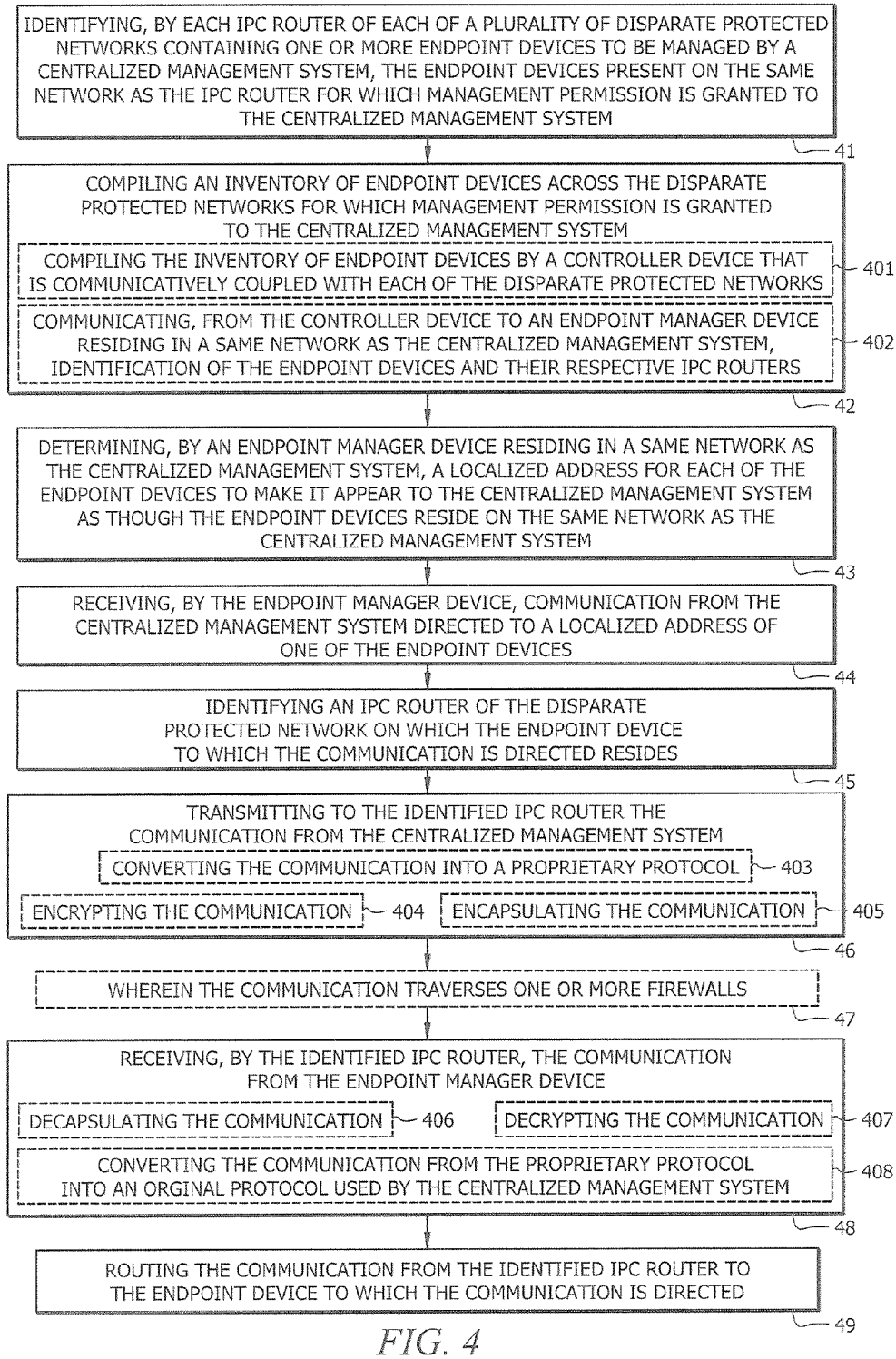
FIG. 4 shows an exemplary operational flow diagram for communicating management information between a centralized management system residing on a first network and network nodes (e.g., communication endpoint devices) residing on disparate protected networks according to one embodiment of the present invention.

FIG. 4 shows an exemplary operational flow diagram for communicating management information between a centralized management system 105 residing on a first network (e.g., LAN 1 of FIG. 2) and endpoint devices residing on disparate protected networks (e.g., endpoint devices 112-113 and 207-208 on LANS 2-3 of FIG. 2) according to one embodiment of the present invention. In operational block 41, IPC routers residing on each of the plurality of disparate protected networks identifies the endpoint devices on its respective network for which management permission is granted to the centralized management system. An administrator of each network may input information to the network's IPC router that designates which endpoint devices on the network that such management permission is granted.

In operational block 42, an inventory of endpoint devices across the disparate protected networks for which management permission is granted to the centralized management system is compiled. As shown in optional sub-block 401 (and as discussed in FIG. 2), in certain embodiments, a secure IPC controller device 110 may perform such inventory to identify the endpoint devices across the disparate protected LANs 2-3 for which management permission is granted to centralized management system 105. Further, as shown in optional sub-block 402, in certain embodiments, the controller device (e.g., IPC controller 110 of FIG. 2) communicates identification of the endpoint devices (and, in the example of FIG. 3 discussed above, their respective IPC routers) to the endpoint manager device (e.g., to SEM 106 of FIGS. 2-3).

In operational block 43, SEM 106 determines a localized address for each of the endpoint devices to make it appear to the centralized management system 105 as though the endpoint devices reside on the same network as the centralized management system 105. For instance, information 201 discussed above with FIG. 2 associates each "far" endpoint device to be managed with a localized address within LAN 1.

In operational block 44, SEM 106 receives communication from the centralized management system 105 that is directed to a localized address of one of the endpoint devices. For instance, the communication may be communication for performing any management operation, such as monitoring an endpoint device, requesting information from the endpoint device, sending scheduling or other information to the endpoint device, updating software of the endpoint device, etc.

In block 45, the IPC router of the disparate protected network on which the endpoint device resides is identified. As discussed above with FIG. 2, in certain embodiments the controller 110 receives the communication from the SEM 106 and identifies the corresponding IPC router to which such communication should be directed in order to reach the destination node to be managed. In other embodiments, such as discussed above with FIG. 3, the SEM 106 may determine (e.g., from locally stored information 316) the IPC router to which the communication should be directed in order to reach the destination node to be managed. In block 46 of FIG. 4, the communication is transmitted to the identified IPC router. As shown in optional sub-blocks 403-405 (any one or more of which may be performed in certain embodiments), SEM 106 (or controller 110) may convert the communication into a proprietary protocol that is known by SEM 106, controller 110, and the IPC router (block 403), encrypt the communication (block 404), and/or encapsulate the communication (block 405) into a single-port communication protocol that is acceptable by a single TCP port. The encapsulated communication may be a single-port communication protocol that is acceptable by any of a plurality of different TCP ports. As shown in optional block 47, in certain embodiments the communication from the SEM 106 to the IPC router (which may flow through controller 110 as discussed above) may traverse one or more firewalls. As discussed above, the firewall may be traversed without requiring reconfiguration of the firewall to accept the communication.

In block 48, the identified IPC router receives the communication from SEM 106 (which, as discussed above, may flow through controller 110). As shown in optional sub-blocks 406-408 (any one or more of which may be performed in certain embodiments), the identified IPC router may decapsulate the communication (block 406), decrypt the communication (block 407), and/or convert (block 408) the communication from the proprietary protocol into an original protocol used by the centralized management system 105 when sending the communication. In block 49, the IPC router sends the communication (in the protocol originally sent by the centralized management system 105) to the endpoint device to which the communication was directed.

In certain embodiments, it is transparent to the management system 105 and the managed endpoint devices that they reside on disparate protected networks and that there is an intermediary between them (e.g., SEM 106, controller 110, and/or IPC routers) that is enabling their connection. Thus, to management system 105 the endpoint devices 112-113 and 207-208 of disparate protected LANs 2-3 of FIG. 2 appear as though they reside on LAN 1, like endpoint devices 108-109. Thus, traditional management systems, like the TMS system, may be employed to manage the endpoint devices 112-113 and 207-208 in the disparate protected LANs 2-3 just as those systems commonly manage the local endpoints 108-109. Further, the administratively burdensome process for establishing a NAT or VPN with appropriate access rules in order to achieve a connection between management system 105 and the remote endpoints residing on disparate protected networks is not required. Further, modification or reconfiguration of the firewalls protecting the disparate networks (e.g., firewalls 102, 104, and 205 of LANs 1-3 in FIG. 2) is not required, and thus the further administrative burden associated with reconfiguring the firewalls is alleviated and the potential reduction in security that may result from any such reconfiguration is likewise avoided by certain embodiments.

According to one embodiment, SEM 106 is an intelligent internal network device (implemented within a given LAN, such as LAN 1 in FIG. 2). Its primary functions in one embodiment are to facilitate the routing, signaling, and validation of IP endpoint management and control protocol packets (e.g., in any application layer protocol, such as HTTP, HTTPS, FTP, TFTP, SSH, TELNET, SNMP, etc., any transport layer protocol, such as TCP, UDP, etc., and/or any internet layer protocol, such as ICMP, etc.) without modifying or impeding the integrity or functionality provided by such packets. Embodiments of the present invention may employ routing, signaling, and validation of IP endpoint management and control via any protocol in the internet layer protocol or higher in the well-known Internet protocol suite. For instance, the SEM 106 may communicate with management system 105 in any such communication protocol that is in the internet layer protocol or higher in the well-known Internet protocol suite, and in certain embodiments of the present invention, SEM 106 may support a plurality (e.g., all) of such various different protocols that exist in the internet layer protocol or higher in the well-known Internet protocol suite. SEM 106 is preferably positioned in the same LAN as the management system that governs and manages IP video and/or audio (VoIP) endpoint communication devices.

SEM 106 may interface with a designated third-party management device or a standalone management workstation. In one embodiment, when connected to an IPC controller 110, SEM 106 provides seamless communication between endpoints and their management host via one single TCP (only) TLS/SSLv3 AES 256 bit encrypted stream. Once the secure link between the SEM 106, IPC controller 110, and IPC routers 111 has been established, the solution then directs and disseminates all management and control packet transmissions to their corresponding destination. In one embodiment, SEM 106 features an integrated intelligent client/host authentication mechanism and robust protocol validation for providing seamless interoperability with a myriad of devices regardless of their native protocol version or requirements.

Benefits of certain embodiments of the present invention include one or more of: a centralized solution for management across disparate protected networks, secure transmission of signaling packets, secure transmission of management and control data packets, expanded reach of network visibility, securing confidential network information, non-bridged resolution of isolated and disparate networks, and firewall and NAT traversal.

In certain embodiments, the communication of information between management system 105 and endpoint devices to be managed can be in any of various different communication protocols. In certain embodiments, the communication is encapsulated (e.g., by SEM 106) into an encapsulated communication for being transmitted on a single TCP port. In certain embodiments the default TCP port is port 443, but an alternate port may be selected for use. Also, as discussed above, the communication between the management system 105 and the endpoint communication devices to be managed is secured in certain embodiments. For instance, the communication may be encrypted (e.g., using AES 256 bit encryption, for example).

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
a management system disposed within a first protected network, wherein the management system is operable to provide management operations with respect to a plurality of network nodes, the management operations comprising at least one management operation selected from the group consisting of scheduling use of a network node, updating software of a network node, and configuring a network node;
at least one network node disposed within a second protected network;
a router device communicatively coupled with said second protected network, wherein said router device identifies one or more of the at least one network node for which management permission is granted to the management system; and
a manager support device disposed within the first protected network, wherein the manager support device receives identification of said one or more network nodes for which management permission is granted to the management system and assigns each of said one or more network nodes of the second protected network a localized address on the first protected network such that the one or more network nodes appear to the management system as residing on the first protected network and are accessible to the management system via their respective localized addresses assigned by the manager support device.

2. The system of claim 1 wherein said one or more network nodes comprise at least one videoconferencing endpoint device.

3. The system of claim 1 wherein the manager support device is configured to receive communication from said management system that is directed to a localized address of said one or more network nodes.

4. The system of claim 3 wherein the manager support device is configured to transmit the received communication to a centralized controller device that resides outside said first protected network; and wherein said centralized controller device directs said communication to said router device.

5. The system of claim 3 wherein the manager support device is configured to encapsulate the received communication into a single-port communication protocol, thereby resulting in an encapsulated communication, and wherein the manager support device is configured to transmit the encapsulated communication.

6. The system of claim 5 wherein said single-port communication protocol is acceptable by a TCP port.

7. The system of claim 5 wherein said single-port communication protocol is acceptable by any of a plurality of different TCP ports.

8. The system of claim 5 wherein said encapsulated communication traverses a firewall of the second protected network.

9. The system of claim 1 wherein the manager support device is configured to convert the received communication into a proprietary protocol that is recognized by the manager support device and the router device.

10. The system of claim 9 wherein the manager support device is configured to encapsulate the converted communication into a single-port communication protocol, thereby resulting in an encapsulated communication, and wherein the manager support device is configured to transmit the encapsulated communication.

11. The system of claim 9 wherein the manager support device is configured to encrypt the converted communication and encapsulate the encrypted communication into a single-port communication protocol, thereby resulting in an encapsulated communication, and wherein the manager support device is configured to transmit the encapsulated communication.

12. A method for communicating management information between a centralized management system residing on a first network and network nodes residing on disparate protected networks, the method comprising:

identifying, by router devices residing on as plurality of disparate protected networks, one or more network nodes on the disparate protected networks for which management permission is granted to a centralized management system, wherein the centralized management system is operable to provide management operations with respect to the one or more network nodes, the management operations comprising at least one management operation selected from the group consisting of scheduling use of a network node, updating software of a network node, and configuring as network node;

determining, by a manager support device residing on a same network as the centralized management system, a localized address for each of the identified network nodes so that the identified, network nodes appear to the centralized management system as though they reside on the same network as the centralized management system and are accessible to the centralized management system via their respective localized addresses assigned by the manager support device;

receiving, by the manager support device, communication from the centralized management system that is directed to a localized address of one of the identified network nodes;

identifying one of the router devices that resides on the disparate protected network on which the network node to which the received communication is directed resides; and transmitting the communication to the identified router device.

13. The method of claim 12 wherein said identifying one of the router devices comprises:
identifying by the endpoint manager device, said one of the router devices.

14. The method of claim 12 further comprising:
transmitting from the manager support device to a centralized controller that resides outside said first network the communication received by the manager support device from the centralized management system; and
wherein said identifying one of the router devices comprises identifying, by the centralized controller, said one of the router devices.

15. The method of claim 12 wherein said transmitting comprises:
transmitting the communication from the manager support device to a centralized controller that resides outside said first network; and
transmitting the communication from the centralized controller to the identified router device.

16. The method of claim 12 further comprising:
converting, by the manager support device, the received communication into a proprietary protocol that is known by the manager support device and the identified router device;
encrypting, by the manager support device, the converted communication; and
encapsulating, by the manager support device, the encrypted communication into a single-port communication protocol that is acceptable by a single TCP port.

17. The method of claim 16 further comprising:
receiving, at the identified router device, the encapsulated communication.

18. The method of claim 17 further comprising:
decapsulating, by the identified router device, the received encapsulated communication;
decrypting, by the identified router device, the encrypted communication; and
converting, by the identified router device, the decrypted communication from the proprietary protocol into an original protocol used by the centralized management system.

19. The method of claim 12 further comprising:
sending the communication from the identified router to the network node to which the communication was directed by the management system.

20. The method of claim 12 further comprising:
encapsulating, by the manager support device, the received communication into a single-port communication protocol that is acceptable by a single TCP port.

21. The method of claim 20 wherein the encapsulated communication is transmitted from the manager support device to the identified router device in said transmitting operation.

22. The method of claim 21 wherein said encapsulated communication traverses one or more firewalls.

23. The method of claim 22 further comprising:
receiving, at the identified router device, the encapsulated communication.

24. The method of claim 23 further comprising:
decapsulating, by the identified router device, the encapsulated communication.

25. The method of claim 24 further comprising:
sending the decapsulated communication from the identified router to the endpoint device to which the communication was directed by the management system.

26. A system comprising:
an endpoint manager device residing on a first protected network to which a centralized management system is also communicatively coupled, wherein the centralized management system is operable to provide management operations with respect to a plurality of communication endpoint devices, the management operations comprising at least one management operation selected from the group consisting of scheduling use of a communication endpoint device, updating software of a communication endpoint device, and configuring a communication endpoint device;
wherein the endpoint manager device is configured to receive identification of one or more communication endpoint devices residing on one or more disparate protected networks for which management permission is granted to the centralized management system; and
wherein said endpoint manager device is configured to assigns each of said one or more communication endpoint devices a localized address on the first protected network such that the one or more communication endpoint devices appear to the centralized management system as residing on the first protected network and are accessible to the centralized management system via their respective localized addresses assigned by the endpoint manager device.

27. The system of claim 26 further comprising:
a router device communicatively coupled with one of said one or more disparate protected networks, wherein said router device is configured to identify one or more communication endpoint devices residing on the same network as the router device for which management permission is granted to the centralized management system.

28. The system of claim 27 further comprising:
a controller device communicatively coupled with said one or more disparate protected networks, wherein said controller device is configured to compile an inventory of said one or more communication endpoint devices residing on the one or more disparate protected networks for which management permission is granted to the centralized management system and communicate the compiled inventory to said endpoint manager device.

29. The system of claim 27 wherein said endpoint manager device is further configured to receive communication from the centralized management system that is directed to a localized address of one of the communication endpoint devices, identify said router device that resides on the disparate protected network on which the endpoint device to which the received communication is directed resides, and transmit the communication to the identified router device.

* * * * *

UNITED STATES PATENT AND TRADEMARK OFFICE
CERTIFICATE OF CORRECTION

PATENT NO. : 8,555,371 B1
APPLICATION NO. : 12/505268
DATED : October 8, 2013
INVENTOR(S) : Christopher S. Signaoff et al.

Page 1 of 1

It is certified that error appears in the above-identified patent and that said Letters Patent is hereby corrected as shown below:

In the Specification:
At column 4, line number 20, delete "implementing VPN" and replace with --implementing a VPN--.
At column 4, line number 37, delete "TFTP, TELNET," and replace with --TFTP, SSH, TELNET,--.
At column 6, line number 65, delete "art," and replace with --art--.
At column 7, line number 44, delete "firewall)." and replace with --firewall.--.
At column 11, line number 2, delete "or" and replace with --(or--.
At column 14, line number 26, delete "110," and replace with --OID),--.
At column 14, line number 59, delete "LAN)" and replace with --LAN 1)--.
At column 16, line number 42, delete "e.g." and replace with --e.g.,--.
At column 18, line number 2, delete "LAN 1" and replace with --LAN 1.--.
At column 18, line number 14, delete "being," and replace with --being--.
At column 19, line number 44, delete "HTTP, FTP," and replace with --HTTP, HTTPS, FTP,--.

In the Claims:
At column 25, claim number 12, line number 1, delete "as" and replace with --a--.
At column 25, claim number 12, line number 11, delete "as" and replace with --a--.
At column 25, claim number 12, line number 15, delete "identified," and replace with --identified--.
At column 25, claim number 13, line number 33, delete "identifying" and replace with --identifying,--.

Signed and Sealed this
Eleventh Day of February, 2014

Michelle K. Lee
*Deputy Director of the United States Patent and Trademark Office*